(12) United States Patent
Botz

(10) Patent No.: US 6,596,674 B2
(45) Date of Patent: Jul. 22, 2003

(54) METAL WORKING LUBRICANTS AND THEIR USE

(75) Inventor: Frank K. Botz, Spartanburg, SC (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/794,489

(22) Filed: Feb. 27, 2001

(65) Prior Publication Data

US 2002/0004465 A1 Jan. 10, 2002

Related U.S. Application Data

(60) Provisional application No. 60/186,165, filed on Feb. 29, 2000, and provisional application No. 60/218,370, filed on Jul. 13, 2000.

(51) Int. Cl.⁷ .................. C10M 129/70; C10M 129/72; C10M 129/16
(52) U.S. Cl. ................. 508/488; 508/485; 508/512; 508/516; 508/517; 508/518; 508/525; 508/579
(58) Field of Search ................. 508/485, 488, 508/512, 525, 579, 516, 517, 518

(56) References Cited

U.S. PATENT DOCUMENTS

| | | | | |
|---|---|---|---|---|
| 2,989,465 A | 6/1961 | Lloyd et al. | ................ | 252/33.4 |
| 3,041,281 A | 6/1962 | Winsor et al. | ................ | 252/42 |
| 3,489,690 A | 1/1970 | Lachampt et al. | .......... | 252/308 |
| 3,945,930 A | * 3/1976 | Sugiyama et al. | .......... | 508/485 |
| 4,207,421 A | 6/1980 | Scardera et al. | ............. | 568/625 |
| 4,445,971 A | 5/1984 | Lappi et al. | ................ | 162/158 |
| 4,493,776 A | 1/1985 | Rhodes | ........................ | 252/25 |
| 4,780,237 A | 10/1988 | Schmid et al. | ......... | 252/174.22 |
| 4,828,735 A | * 5/1989 | Minagawa et al. | ......... | 508/485 |
| 4,830,768 A | 5/1989 | Reich et al. | ................ | 252/49.3 |
| 5,230,730 A | 7/1993 | Speckmann et al. | ...... | 106/14.13 |
| 5,259,970 A | 11/1993 | Kanamori et al. | ............. | 252/73 |
| 5,484,541 A | 1/1996 | Przybylski et al. | ........... | 252/17 |
| 5,652,204 A | * 7/1997 | Cracknell et al. | ........... | 508/562 |
| 5,705,476 A | 1/1998 | Hoffarth | ..................... | 510/535 |
| 6,383,991 B1 | * 5/2002 | Hashimoto et al. | ......... | 508/161 |

FOREIGN PATENT DOCUMENTS

| | | |
|---|---|---|
| CH | 510 455 | 9/1971 |
| DE | 39 33 137 | 4/1991 |
| DE | 42 12 592 | 10/1993 |
| DE | 43 23 908 | 1/1995 |
| DE | 43 23 909 | 1/1995 |
| DE | 196 49 102 | 5/1998 |
| EP | 0 254 208 | 1/1988 |
| EP | 0 681 865 | 11/1995 |
| FR | 1 423 085 | 3/1966 |
| GB | 833 868 | 5/1960 |
| JP | 04 318100 | 9/1992 |
| WO | WO 98/32527 | 7/1998 |

* cited by examiner

*Primary Examiner*—Jacqueline V. Howard
(74) *Attorney, Agent, or Firm*—Stephen D. Harper; Mary K. Cameron

(57) ABSTRACT

The invention is a liquid composition of matter useful as a metal working lubricant. The composition comprises a primary lubricity component, such as a polyether or polyether ester, and dissolved salts of carboxylic acids. The composition preferably contains not more than 0.2 percent of any element except carbon, hydrogen, oxygen, alkaline earth metals, alkali metals, inorganically bonded halogens, inorganically bonded nitrogen, inorganically bonded sulfur, and inorganically bonded phosphorus.

33 Claims, No Drawings

METAL WORKING LUBRICANTS AND THEIR USE

This application claims priority from U.S. provisional application Ser. No. 60/186,165, filed Feb. 29, 2000, and U.S. provisional application Ser. No. 60/218,370, filed Jul. 13, 2000, each of which is incorporated herein by reference in its entirety.

TECHNICAL FIELD

The technical field to which the invention relates is a liquid composition of matter that is useful as a metal working lubricant. The composition comprises a primary lubricity component and one or more dissolved salts of carboxylic acids.

BACKGROUND OF THE INVENTION

A variety of useful processes that cut, drill, or substantially deform metals require the use of a lubricant during the metal working process in order to make the process practical. Although they may be water based, essentially all practical lubricants contain organic chemical substances. Such chemical substances traditionally have included substances that contain at least one of the following heteroatom types: halogen, sulfur, nitrogen, and phosphorus. One of the major reasons for the presence of substances including these heteroatoms is to inhibit corrosion of the metals being worked. Such lubricants may also contain boron as part of at least one of their constituent chemical substances, either organic or, more often, inorganic amine borates.

Many chemical substances that include at least one of halogen, sulfur, nitrogen, phosphorus, and boron atoms are now recognized as environmentally suspect. Even if the specific chemical substances containing such atoms in a compounded metal working lubricant are not themselves suspect, the heat, mechanical force, and generation of highly reactive freshly cut metal surfaces inherent to the metal working process can convert chemical substances initially present into other substances that are environmentally undesirable. If halogen, sulfur, nitrogen, phosphorus, and boron atoms are not present in the lubricant at all, no chemical reaction of the lubricant constituents can generate environmentally undesirable substances containing these atoms unless the atoms are supplied from some outside source. In practical metal working environments, the only prevalent outside source of these atoms is atmospheric elemental nitrogen gas, which is difficult to cause to react chemically. Therefore, a lubricant free from these atoms has less pollution potential than conventional lubricants that contain these atoms.

Furthermore, many conventional metal working lubricants can cause dermatitis after human skin comes into contact with the lubricants. Lubricants free from halogen, sulfur, nitrogen, phosphorus, and boron are believed less likely to have this undesirable characteristic.

It would be desirable to provide a practically effective metal working lubricant that is substantially free from boron and from organic halogen, sulfur, nitrogen, and phosphorus. It would be further desirable to reduce the risk of dermatitis from contact of metal working lubricants with human skin.

SUMMARY OF THE INVENTION

It has surprisingly been found that a combination of a primary lubricity component selected from the group consisting of polyethers and polyether esters, and salts of carboxylic acids, and, optionally, one or more of alkalinizing agents, neutral organic polymers that are water-soluble and are not polyethers or polyether esters, and antimicrobial agents constitute a metal working lubricant that can satisfactorily replace existing metal working lubricants that contain the above noted undesirable constituents in most metal working operations.

Embodiments of the invention include liquid, working compositions suitable to serve directly as metal working lubricants; concentrate compositions from which working compositions can be prepared by mixing the concentrate compositions and optionally other materials, with water; and processes for metal working in which a composition according to the invention as defined above is utilized as a lubricant.

It will be appreciated that most working compositions may also be considered to be concentrate compositions, inasmuch as all working compositions other than the most dilute ones that are satisfactory can by definition be diluted and still be suitable as working compositions.

BEST MODE FOR CARRYING OUT THE INVENTION CLAIMED

One necessary ingredient of a composition according to this invention is its primary lubricity component. A suitable class of materials to constitute all or part of this component is a polyether. Preferably, such a molecule is made by polymerizing one or more alkylene oxides, either by themselves or together with one or more types of alcohol molecules. If desired, some or all of the free hydroxyl groups are capped with alkyl moieties. Preferably, any capping moieties, and any monoalcohols included as chain terminators in an elimination polymerization, contain not more than, with increasing preference in the order given, 4, 3, 2, or 1 carbon atoms.

The polyether may be made from one or more types of predominantly polyfunctional alcohol molecules by an elimination polymerization. In that process, two hydroxyl moieties, one in each of two distinct molecules, react to eliminate one water molecule and join the two distinct molecules into a single molecule. An ether oxygen moiety replaces both of the reacted hydroxyl moieties. The remainder of said two molecules remain in place in the newly formed molecule. In order to prepare a polymer of reasonably high molecular weight, most of the alcohol molecules so reacted contain at least two hydroxyl moieties before the elimination polymerization reaction, but small amounts of monofunctional alcohols could be included as chain terminators if desired.

Various suitable polyoxyalkylene polyethers are commercially available. Most are made by addition polymerization of at least one of ethylene, propylene and butene oxides and/or elimination polymerization of at least one of ethylene, propylene and butylene glycols, optionally followed by capping one or both of the terminal hydroxy moieties that result from such polymerizations. Alcohols containing one or more hydroxy groups may be used as initiators in such addition polymerizations, thereby providing polyoxyalkylene polyethers containing residues derived from said alcohol initiators. Such materials are satisfactory for some uses according to this invention, but in many instances these "simple" polyethers result in a working composition with a strong foaming tendency. Therefore, the polyether component for this invention is preferably selected from polyethers that are prepared by reaction of:

a) polyalcohol molecules, each of which contains at least three hydroxyl moieties and at least three carbon atoms and preferably contains not more than, with increasing preference in the order given, 10, 8, 6, 4, or 3 hydroxyl moieties and further preferably contains not more than, with increasing preference in the order given, 10, 8, 6, 4, or 3 carbon atoms;

with b) at least one type of alkylene oxide (alternatively called oxirane), each of which preferably, at least for economy, contains not more than, with increasing preference in the order given, 4, 3, 2, or 1 oxirane moiety and preferably contains not more than, with increasing preference in the order given, 8, 6, 4, 3, or 2 carbon atoms.

Still more preferably, this type of polyether material for the primary lubricity component of a metal working lubricant composition according to this invention constitutes molecules that are made by reacting glycerine with at least one of ethylene and propylene oxides. Most preferably, both ethylene and propylene oxides are present in a molar ratio of propylene oxide to ethylene oxide that is at least, with increasing preference in the order given, 1.0:1.00, 1.5:1.00, 2.0:1.00, 2.5:1.00, 2.7:1.00, or 2.9:1.00, and preferably is not more than, with increasing preference in the order given, 10:1.00, 8:1.00, 6.0:1.00, 5.0:1.00, 4.5:1.00, 4.0:1.00, 3.5:1.00, or 3.1:1.00.

The molar ratio of total alkylene oxides to the glycerine with which the alkylene oxides are reacted is at least, with increasing preference in the order given, 6:1.00, 12:1.00, 18:1.00, 24:1.00, 30:1.00, 36:1.00, 42:1.00, or 46:1.00, and preferably is not more than, with increasing preference in the order given, 400:1.00, 300:1.00, 200:1.00, 150:1.00, 125:1.00, 100:1.00, 80:1.00, 60:1.00, 55:1.00, or 50:1.00.

This type of polyether substance as a whole, when separated from other materials, preferably has the following physical properties:

a number average molecular weight that is at least, with increasing preference in the order given, $0.2 \cdot 10^3$, $0.4 \cdot 0^3$, $0.6 \cdot 10^3$, $0.8 \cdot 10^3$, $1.0 \cdot 10^3$, $1.2 \cdot 10^3$, $1.4 \cdot 10^3$, $1.6 \cdot 10^3$, $1.8 \cdot 10^3$, $2.0 \cdot 10^3$, $2.2 \cdot 10^3$, $2.4 \cdot 10^3$, or $2.6 \cdot 10^3$ Daltons, and preferably is not more than, with increasing preference in the order given, $20 \cdot 10^3$, $15 \cdot 10^3$, $10 \cdot 10^3$, $8 \cdot 10^3$, $6 \cdot 10^3$, $5.0 \cdot 10^3$, $4.5 \cdot 10^3$, $4.0 \cdot 10^3$, $3.5 \cdot 10^3$, $3.0 \cdot 10^3$, or $2.7 \cdot 10^3$ Daltons;

a viscosity at 0° C. that is at least, with increasing preference in the order given, $0.4 \cdot 10^3$, $0.6 \cdot 10^3$, $0.8 \cdot 10^3$, $1.0 \cdot 10^3$, $1.2 \cdot 10^3$, $1.6 \cdot 10^3$, $1.8 \cdot 10^3$, or $2.0 \cdot 10^3$ centistokes, and preferably is not more than, with increasing preference in the order given, $20 \cdot 10^3$, $15 \cdot 10^3$, $10 \cdot 10^3$, $8 \cdot 10^3$, $6 \cdot 10^3$, $5.0 \cdot 10^3$, $4.5 \cdot 10^3$, $4.0 \cdot 10^3$, $3.5 \cdot 10^3$, $3.0 \cdot 10^3$, $2.7 \cdot 10^3$, $2.4 \cdot 10^3$, or $2.1 \cdot 10^3$ centistokes;

a viscosity at 25° C. that is at least, with increasing preference in the order given, $0.10 \cdot 10^3$, $0.20 \cdot 10^3$, $0.25 \cdot 10^3$, $0.30 \cdot 10^3$, $0.35 \cdot 10^3$, $0.36 \cdot 10^3$, $0.38 \cdot 10^3$, $0.40 \cdot 10^3$, or $0.42 \cdot 10^3$ centistokes, and preferably is not more than, with increasing preference in the order given, $4.0 \cdot 10^3$, $3.0 \cdot 10^3$, $2.5 \cdot 10^3$, $2.0 \cdot 10^3$, $1.5 \cdot 10^3$, $1.2 \cdot 10^3$, $0.9 \cdot 10^3$, $0.70 \cdot 10^3$, $0.60 \cdot 10^3$, $0.53 \cdot 10^3$, $0.49 \cdot 10^3$, $0.46 \cdot 10^3$, or $0.43 \cdot 10^3$ centistokes;

a viscosity at 38° C. that is at least, with increasing preference in the order given, $0.05 \cdot 10^3$, $0.10 \cdot 10^3$, $0.13 \cdot 10^3$, $0.160 \cdot 10^3$, $0.170 \cdot 10^3$, $0.180 \cdot 10^3$, $0.190 \cdot 10^3$, or $0.200 \cdot 10^3$ centistokes, and preferably is not more than, with increasing preference in the order given, $2.0 \cdot 10^3$, $1.5 \cdot 10^3$, $1.0 \cdot 10^3$, $0.75 \cdot 10^3$, $0.60 \cdot 10^3$, $0.40 \cdot 10^3$, $0.35 \cdot 10^3$, $0.30 \cdot 10^3$, $0.27 \cdot 10^3$, $0.25 \cdot 10^3$, $0.23 \cdot 10^3$, or $0.21 \cdot 10^3$ centistokes;

a viscosity at 99° C. that is at least, with increasing preference in the order given, 5, 8, 11, 14, 17, 19, 21, 23, 25, 27, 29, or 31 centistokes, and preferably is not more than, with increasing preference in the order given, 300, 250, 200, 150, 100, 90, 80, 70, 60, 55, 50, 45, 40, 35, or 33 centistokes; and a specific gravity at 25° C. that is at least, with increasing preference in the order given, 1.000, 1.010, 1.020, 1.030, 1.035, 1.040, 1.045, 1.050, 1.055, or 1.059, and preferably is not more than, with increasing preference in the order given, 1.20, 1.18, 1.16, 1.14, 1.12, 1.100, 1.080, 1.075, 1.070, 1.065, or 1.061.

A second group of suitable materials that may constitute all or part of the primary lubricity component of a composition according to this invention are denoted herein as "polyether esters". These are materials that may be made by condensing alkylene oxides with carboxylic acids rather than solely with other alkylene oxide molecules and/or alcohols, as for the polyethers described above. These materials may also be prepared by condensing hydroxy-terminated polyoxyalkylene polyethers or glycols with carboxylic acids. For the polyether esters to be used as all or part of a primary lubricity component of a composition according to this invention, the following preferences apply:

each molecule contains at least one and preferably at least two ester moieties

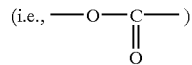

and independently preferably contains not more than, with increasing preference in the order given, 10, 8, 6, 5, 4, 3, or 2 ester moieties;

in each molecule that contains at least two ester moieties, the carbon atoms of each pair of ester moieties are separated from one another by a number of other carbon atoms that is at least, with increasing preference in the order given, 1, 2, 3, or 4, and preferably is not more than 50, 30, 20, 15, 10, 8, 6, or 4;

each "terminal esterifying moiety", which is defined as a monovalent moiety that is bonded directly to the oxygen atom rather than to the carbon atom in an ester moiety in a polyether ester molecule, conforms to the general chemical formula —$(C_nH_{2n}O)_d$—H, wherein: each of n and d independently represents a positive integer, which may be the same or different; n is at least 2; and if d is greater than one, the value of n in any one of the $(C_nH_{2n}O)$ units in the general formula may be the same as or different from the value of n in any other of the $(C_nH_{2n}O)$ units in the general formula; and for the polyether ester substance as a whole, when it contains terminal esterifying moieties as defined above:

the average value of n in the general formula for a terminal esterifying moiety is not more than, with increasing preference in the order given, 4.0, 3.0, 2.8, 2.6, 2.4, 2.2, or 2.0;

the average value of d in the general formula for a terminal esterifying moiety is at least, with increasing preference in the order given, 1.5, 2.5, 3.0, 3.5, 4.0, or 4.3, and preferably is not more than, with increasing preference in the order given, 30, 20, 10, 8.0, 7.0, 6.5, 6.0, 5.5, or 5.0;

the number of carbon atoms in terminal esterifying moieties has a ratio to the total number of carbon atoms in the polyether esters that is at least, with increasing preference in the order given, 0.10:1.00, 0.20:1.00, 0.30:1.00, 0.35:1.00, 0.40:1.00, 0.45:1.00, 0.50:1.00, 0.55:1.00, 0.60:1.00, 0.65:1.00, 0.70:1.00, or 0.74:1.00, and preferably is not more than, with increasing preference in the order given, 8:1.00, 5:1.00, 3:1.00, 2.0:1.00, 1.5:1.00, 1.3:1.00, 1.1:1.00, 0.90:1.00, 0.85:1.00, 0.80:1.00, or 0.76:1.00;

the number of ether oxygen atoms, not including any oxygen atoms that are part of an ester moiety, has a ratio to the number of carbon atoms in the polyether esters that is at least, with increasing preference in the order given, 0.05:1.00, 0.10:1.00, 0.15:1.00, 0.20:1.00, 0.25:1.00, 0.29:1.00, 0.31:1.00, 0.33:1.00, 0.35:1.00, or 0.37:1.00, and preferably is not more than, with increasing preference in the order given, 4.0:1.00, 3.0:1.00, 2.0:1.00, 1.5:1.00, 1.0:1.00, 0.80:1.00, 0.70:1.00, 0.60:1.00, 0.55:1.00, 0.50:1.00, 0.47:1.00, 0.44:1.00, 0.41:1.00, or 0.39:1.00; and the number of ether oxygen atoms, not including any oxygen atoms that are part of an ester moiety, has a ratio to the number of ester moieties in the polyester ethers that is at least, with increasing preference in the order given, 1.0:1.00, 2.0:1.00, 2.5:1.00, 3.0:1.00, 3.5:1.00, 4.0:1.00, or 4.4:1.00, and preferably is not more than, with increasing preference in the order given, 20:1.00, 15:1.00, 12:1.00, 9.5:1.00, 8.5:1.00, 7.5:1.00, 6.5:1.00, or 5.5:1.00.

The concentration of the primary lubricity component as a percentage of the total working composition (i.e. the composition as it exists when being utilized as a lubricant) preferably is at least, with increasing preference in the order given, 0.05, 0.10, 0.15, 0.20, 0.25, 0.30, 0.35, 0.40, 0.45, or 0.48 percent, and preferably, at least for economy, is not more than, with increasing preference in the order given, 5, 3, 2.0, 1.5, 1.0, 0.90, 0.80, 0.75, 0.70, 0.65, 0.60, 0.55, or 0.52 percent.

The other necessary component in a composition according to the invention is an at least partially dissolved salt of a carboxylic acid. For convenience and economy, these salts are usually supplied to the composition in the form of their corresponding acid and are neutralized in situ with a suitable alkalinizing agent, generally an alkali metal hydroxide. Because the particular cation present in the salt is not believed to have any significant effect on the performance obtained, the concentration(s) of salt is usually specified herein in terms of its stoichiometric equivalent as a corresponding acid. The total concentration of carboxylic acid as a percentage of the total working composition in a working metal working lubricant composition according to the invention preferably is at least, with increasing preference in the order given, 0.2, 0.4, 0.6, 0.70, 0.75, 0.80, 0.85, 0.90, 0.95, 1.00, 1.05, 1.10, 1.13, or 1.15 percent, and preferably is not more than, with increasing preference in the order given, 12, 10, 8, 6, 5.0, 4.0, 3.0, 2.5, 2.0, 1.8, or 1.6 percent. Any carboxylic acid added to or mixed with a composition according to the invention is to be included in this total, as is the stoichiometric equivalent as acid of any salt of a carboxylic acid added to or mixed with the composition, irrespective of whatever degree of neutralization or ionization of the acid or the salt may prevail in the actual composition.

The ratio of the concentration of carboxylic acid to the concentration of primary lubricity component in the same composition according to the invention preferably is at least, with increasing preference in the order given, 0.5:1.0, 1.0:1.0, 1.9:1.0, 2.1:1.0, 2.3:1.0, 2.5:1.0, or 2.7:1.0, and preferably is not more than, with increasing preference in the order given, 10:1.0, 8:1.0, 6.0:1.0, 5.5:1.0, 5.0:1.0, 4.5:1.0, 4.0:1.0, 3.7:1.0, 3.5:1.0, 3.3:1.0, 3.1:1.0, or 2.9:1.0.

The carboxylic acid(s) corresponding to the salt component of a metal working lubricant according to the invention preferably do not contain carbon—carbon double bonds, except as part of an aromatic nucleus in which the electrons in any carbon—carbon double bonds are delocalized into a cyclic structure. Also independently, the salts are preferably not derived from any single acid, but from a mixture of acids. More particularly, independently for each listed property:

the mixture of acids preferably includes both monocarboxylic acids and dicarboxylic acids, in a molar ratio of monocarboxylic to dicarboxylic acids that more preferably is at least, with increasing preference in the order given, 1.0:1.00, 1.5:1.00, 2.0:1.00, 2.5:1.00, 3.0:1.00, 3.5:1.00, 4.0:1.00, 4.5:1.00, or 4.9:1.00, and more preferably is not more than, with increasing preference in the order given, 50:1.00, 40:1.00, 30:1.00, 25:1.00, 20:1.00, 15:1.00, 13.0:1.00, 12.0:1.00, 11.0:1.00, or 10:1.00;

the mixture of acids preferably includes both aliphatic and aromatic acids, in a molar ratio of aliphatic to aromatic acids that more preferably is at least, with increasing preference in the order given, 0.2:1.00, 0.5:1.00, 0.8:1.00, 1.1:1.00, 1.4:1.00, 1.6:1.00, 1.8:1.00, 2.0:1.00, or 2.2:1.00, and more preferably is not more than, with increasing preference in the order given, 40:1.00, 30:1.00, 25:1.00, 20:1.00, 15:1.00, 10:1.00, 8:1.00, 7.0:1.00, 6.5:1.00, 6.0:1.00, 5.5:1.00, 5.0:1.00, 4.6:1.00, 4.3:1.00, or 4.1:1.00;

the mixture of acids includes both monocarboxylic aliphatic acids and dicarboxylic aliphatic acids, in a molar ratio of monocarboxylic aliphatic acids to dicarboxylic aliphatic acids that more preferably is at least, with increasing preference in the order given, 0.2:1.00, 0.5:1.00, 0.8:1.00, 1.1:1.00, 1.4:1.00, 1.6:1.00, 1.8:1.00, 2.0:1.00, 2.2:1.00, 2.4:1.00, or 2.6:1.00, and more preferably is not more than, with increasing preference in the order given, 20:1.00, 15:1.00, 10:1.00, 8,:1.00 6.0:1.00, 5.5:1.00, 5.0:1.00, 4.5:1.00, 4.2:1.00, 3.9:1.00, 3.6:1.00, 3.3:1.00, 3.0:1.00, or 2.8:1.00;

the mixture of acids includes both straight chain and branched aliphatic monocarboxylic acids, in a molar ratio of straight chain to branched that more preferably is at least, with increasing preference in the order given, 0.10:1.00, 0.25:1.00, 0.4:1.00, 0.55:1.00, 0.80:1.00, 0.90:1.00, 1.00:1.00, 1.10:1.00, 1.20:1.00, or 1.30:1.00, and more preferably is not more than, with increasing preference in the order given, 50:1.00, 40:1.00, 30:1.00, 20:1.00, 15:1.00, 12:1.00, 10.0:1.00, 9.5:1.00, 9.0:1.00, 8.5:1.00, 8.0:1.00, 7.8:1.00, 7.6:1.00, or 7.4:1.00;

the mixture of acids includes both aromatic carboxylic acids that contain at least one hydroxyl moiety in each molecule in addition to a carboxyl moiety in the same molecule and aromatic carboxylic acids that do not contain any hydroxyl moieties other than as part of carboxyl moieties, in a molar ratio of the latter of these types of acids to the former that more preferably is at least, with increasing preference in the order given, 0.3, 0.6, 0.9, 1.1, 1.3, or 1.5:1.00, and more preferably is not more than, with increasing preference in the order given, 10, 8, 6.0, 5.0, 4.5, 4.0, 3.5, 3.2, 2.9, 2.7, 2.5, 2.3, or 2.1:1.00;

the mixture of acids includes at least one branched aliphatic monocarboxylic acid, and at least, with increasing preference in the order given, 30, 50, 60, 70, 80, 85, 90, 95, or 99 mole percent of the molecules of said branched aliphatic monocarboxylic acids include at least one, more preferably exactly one, carbon atom that is bonded to each of four other carbon atoms by carbon—carbon single bonds.

Preferred monocarboxylic aliphatic acids are those acids which contain from 6 to 12 carbon atoms per molecule. Preferred dicarboxylic aliphatic acids are those acids which contain from 6 to 14 carbon atoms per molecule. Neodecanoic acid (7,7-dimethyl-1-octanoic acid) is an especially preferred branched aliphatic monocarboxylic acid.

For the salt component as a whole, the number of carboxylate groups has a ratio to the total number of carbon atoms that is at least, with increasing preference in the order given, 0.02:1.00, 0.04:1.00, 0.06:1.00, 0.08:1.00, 0.090:1.00, 0.095:1.00, 0.100:1.00, 0.105:1.00, 0.110:1.00, 0.115:1.00, 0.120:1.00, 0.124:1.00, or 0.128:1.00, and preferably is not more than, with increasing preference in the order given, 0.70:1.00, 0.60:1.00, 0.50:1.00, 0.40:1.00, 0.35:1.00, 0.31:1.00, 0.28:1.00, 0.25:1.00, 0.23:1.00, 0.21:1.00, 0.19:1.00, 0.17:1.00, or 0.15:1.00.

A preferred characteristic of a working metal working lubricant according to this invention that is not determined by any single ingredient of the metal working lubricant is its pH value. This value preferably is at least, with increasing preference in the order given, 6.30, 6.40, 6.50, 6.60, 6.70, 6.80, 6.90, or 7.00 and preferably is not more than, with increasing preference in the order given, 11, 10.5, 10.0, 9.8, 9.6, 9.4, 9.2, 9.0, 8.8, 8.6, 8.4, 8.2, or 8.0. A major disadvantage of pH values outside the optimum range is greater danger of corrosion, particularly of mild steel with which the metal working lubricant is often used. Additionally, any pH value lower than optimum increases the danger of phase separation, and therefore inconsistent lubricating action, in a metal working lubricant. Any alkalinizing agent present in a metal working lubricant according to the invention preferably is present in an amount that results in a pH within a preferred range.

For convenience and economy, sodium and potassium hydroxides are the preferred alkalinizing agents. It will be apparent to those skilled in the art that many other alkalinizing agents, such as other alkali metal hydroxides, water soluble alkaline earth metal hydroxides, and water soluble alkali and alkaline earth metal oxides and carbonates, could alternatively be used.

Metal working lubricants according to this invention that contain only their necessary ingredients and alkalinizing agents may be susceptible to microbial degradation. In order to prevent this, it has been found advantageous to include in the metal working lubricant an antimicrobial agent. At least four antimicrobial agents that do not include heteroatoms are known and may be advantageously employed for this purpose. These antimicrobial agents are 12-hydroxy-5,8,11-trioxadodecane, 1,6-dihydroxy-2,5-dioxahexane (the preceding two antimicrobial agents normally being used together), 6-acetoxy-2,4-dimethyl-1,3-dioxane, and dialdehydes, particularly glutaraldehyde (also known as pentanedial). The latter of these is particularly preferred, at least in the U.S., where its legal status as an antimicrobial is better established than any of the other heteroatom-free antimicrobials. When glutaraldehyde is used as an antimicrobial agent, its concentration in a working metal working lubricant according to the invention preferably is that provided by addition of a 45% solution of glutaraldehyde in water in an amount that is at least, with increasing preference in the order given, 0.08, 0.16, 0.25, 0.30, 0.35, 0.40, 0.45, 0.50, 0.55, 0.60, or 0.65 milliliters of the solution of glutaraldehyde per liter of working metal working lubricant, and preferably, at least for economy, is not more than, with increasing preference in the order given, 5, 3, 2.0, 1.5, 1.0, 0.80, or 0.70 milliliters of the solution of glutaraldehyde per liter of working metal working lubricant.

The composition of the present invention may additionally include, if so desired, one or more additives selected from antifoaming agents (defoamers), antioxidants, corrosion inhibitors, metal chelating agents and the like. Preferably, the compositions are substantially or essentially free of water-insoluble hydrocarbon oils, waxes and the like.

In addition to the components described above, it will generally be desirable to include at least one diluent in the compositions of the invention. Water is a preferred diluent. Although other substances besides water may be utilized, for economic, environmental and health and safety reasons, it will generally be desirable to avoid the use of organic solvents, especially flammable solvents and solvents classified as volatile organic compounds. In preferred embodiments of the invention, the components of the composition are selected and their relative proportions and concentrations adjusted so as to provide a single phase formulation.

It is preferable for the concentrations of most of the chemical elements to be minimized in any working metal working lubricant according to the invention. More particularly, independently for each element, it is preferred that the concentration of any element except carbon, hydrogen, oxygen, alkaline earth metals, alkali metals, and inorganically bonded halogen, inorganically bonded nitrogen, inorganically bonded sulfur, and inorganically bonded phosphorus should not be more than, with increasing preference in the order given, 2.0, 1.0, 0.5, 0.20, 0.10, 0.05, 0.02, 0.005, or 0.002 percent; more preferably, the concentration of any element other than carbon, hydrogen, oxygen, alkali metals, and alkaline earth metals should not be more than, with increasing preference in the order given, 2.0, 1.0, 0.5, 0.20, 0.10, 0.05, 0.02, 0.005, or 0.002 percent.

In order to minimize transportation costs, it is generally preferred to sell a metal working lubricant according to this invention in the form of a concentrate, which can be diluted with water at the point of use. A single package concentrate that contains all of the non-water ingredients other than possibly the antimicrobial agent is most preferred. In such a single-package concentrate, the preferred minimum concentration of each ingredient other than water preferably is, with increasing preference in the order given, 2, 4, 6, 8, 10, 12, 14, 16, 18, or 20 times the preferred concentration given above for the same ingredient in a working metal working lubricant according to the invention.

The compositions of the present invention are useful as metal working fluids, cutting fluids, and the like and may be employed using any of the conventional techniques. Applying a coating of the composition to the surface of a metal substrate will significantly lower the coefficient of friction associated with the surface. Application may be accomplished by spraying, brushing, roll coating, immersion or other such methods. The coated metal substrate may then be plastic worked, cut, ground or machined in the manner desired, the coating of the composition providing favorable lubricating effect.

This invention may be further appreciated in detail by consideration of the following examples, including preferred embodiments, which are not intended to limit the invention in any way.

EXAMPLES

Concentrate compositions according to the invention intended to be suitable for making working metal working lubricants by dilution to 20 times their own weight were prepared. Details are shown in Table 1, in which any unspecified constituent of each composition was water. A blank cell in Table 1 indicates that none of the ingredients on the same line as the cell was deliberately added to the candidate composition with the number heading the column of the cell (except possibly under a different ingredient name.) The materials identified by other than standard chemical names in the "Ingredient" column of Table 1 had the following characteristics: CORFREE™ M-1 dibasic acid mixture is a commercial product of du Pont and is reported by its supplier to contain typically 42% of dodecanedioic acid; 31% of undecanedioic acid, 5% of sebacic acid, 11% of other dibasic acids; 11% of other organics, 0.5% nitrogen, and 0.3% water; CORFREE™ M-2 is a commercial dodecanedioic acid product of duPont; DOW™ 15-200 polyglycol copolymer is a commercial product of Dow Chemical and is reported by its supplier to consist of the reaction product of glycerine with a mixture of propylene oxide ("PO") and ethylene oxide ("EO") in a molar ratio of PO:EO of 3:1 and to have a weight average molecular weight of $2.6 \times 10^3$; and "PEG 200 adipate" is a commercial product of Werner G. Smith and is reported by its supplier to consist of adipic acid diesterified with ethylene oxide polymers having a weight average molecular weight of 200.

Except in the claims and the specific examples, or where otherwise expressly indicated, all numbers in this description indicating amounts of material or conditions of reaction and/or use are to be understood as modified by the word "about" in describing the broadest scope of the invention. Practice within the numerical limits stated is generally preferred, however. Also, throughout this specification, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; the description of constituents in chemical terms refers to the constituents at the time of addition to any combination specified in the description, or as reduced or increased in amount in situ by chemical reactions explicitly stated in the description, and does not necessarily preclude unstated chemical interactions among the constituents of a mixture once mixed; a specification of materials in ionic form additionally implies the presence of sufficient counterions to produce electrical neutrality for the composition as a whole (any counterions thus implicitly specified should preferably be selected from among other constituents explicitly specified in ionic form, to the extent possible; otherwise such counterions may be freely selected, except for avoiding counterions that act adversely to any of the objects of the invention); and the term "mole" means "gram mole" and the term itself and its grammatical variations may be applied to elemental, ionic, unstable, hypothetical, and any other chemical species defined by number and type of atoms present, as well as to compounds with well defined molecules.

What is claimed is:

1. A liquid composition of matter that is useful as a metal working lubricant, said composition comprising:
   (A) at least one primary lubricity component selected from the group consisting of:
      (a) polyoxyalkylene polyethers: and
      (b) polyether esters;
   (B) one or more at least partially dissolved salts of monocarboxylic acids and one or more at least partially dissolved salts of dicarboxylic acids, wherein the molar ratio of monocarboxylic acids: dicarboxylic acids is from 1:1 to about 50:1; and
   (C) not more than 0.2 weight percent of any element except carbon, hydrogen, oxygen, alkaline earth metals, alkali metals, inorganically bonded halogens, inorganically bonded nitrogen, inorganically bonded sulfur, and inorganically bonded phosphorus.

2. The liquid composition of matter of claim 1 wherein at least one primary lubricity component is a polyoxyalkylene polyether made by addition polymerization of one or more alkylene oxides selected from the group consisting of ethylene oxide, propylene oxide, and butene oxide.

3. The liquid composition of matter of claim 1 wherein at least one primary lubricity component is a polyether ester made by condensing at least one alkylene oxide, glycol, or hydroxy-terminated polyoxyalkylene polyether with at least one carboxylic acid.

4. The liquid composition of matter according to claim 1 additionally comprising a diluent.

TABLE 1

| | Weight Percent of Ingredient in Concentrate Composition Example Number: | | | | | | | | | | |
|---|---|---|---|---|---|---|---|---|---|---|---|
| Ingredient | 1 | 2 | 3 | 4 | 5 | 6 | 7 | 8 | 9 | 10 | 11 |
| 50% solution of NaOH in water | 17.2 | 17.3 | 17.1 | 17.2 | 16.5 | 17.3 | 16.3 | 17.3 | 30 | | |
| Benzoic acid | 5.0 | 5.5 | 5.0 | 5.0 | 4.8 | 4.9 | 4.9 | 5.0 | 20.7 | 2.17 | |
| CORFREE ™ M-1 dibasic acid mixture | 7.5 | | 10.0 | 7.6 | 7.3 | 7.4 | 7.4 | | | 3.29 | |
| CORFREE ™ M-2 dodecanedioic acid | | | | | | | | | | | 5 |
| 7,7-Dimethyl-1-octanoic acid | 6.0 | 5.9 | 6.0 | 6.0 | 5.7 | 5.4 | 5.4 | 6.0 | 10.0 | 14.4 | 10.5 |
| 1-Heptanoic acid | 6.0 | 4.9 | 6.2 | 5.8 | 5.5 | 5.4 | 5.4 | 5.0 | 12.0 | 1.96 | 10 |
| Salicylic acid | 3.5 | | 3.0 | 3.5 | 4.8 | 4.9 | 4.9 | 2.5 | | 1.40 | |
| DOW ™ 15-200 polyglycol copolymer | 10.0 | 9.9 | | 10.0 | 12.4 | 10.0 | 11.0 | 10.0 | 20.3 | | 25 |
| Sebacic acid | | 7.4 | 7.5 | | | | | 7.6 | 2.0 | | |
| 2,4-Dihydroxy benzoic acid | | 2.4 | | | | | | 5.0 | | | |
| "PEG 200 adipate" | | | | | | | | | | 19.0 | |
| 45% Solution of KOH in water | | | | | | | | | | 23 | 20 |

5. The liquid composition of matter of claim 4 wherein the diluent comprises water.

6. The liquid composition of matter of claim 1 additionally comprising an anti-microbial agent.

7. The liquid composition of matter of claim 1 wherein said liquid composition of matter has a pH value between about 6.3 and about 11.

8. The liquid composition of matter of claim 1 comprising at least one partially dissolved salt of a carboxylic acid selected from the group consisting of monocarboxylic aliphatic acids, dicarboxylic aliphatic acids, and aromatic carboxylic acids.

9. The liquid composition of matter of claim 1 wherein the weight ratio of carboxylic acid: primary lubricity component is from about 0.5:1.0 to about 10:1.0.

10. The liquid composition of matter of claim 1 containing not more than 0.2 weight percent of any element other than carbon, hydrogen, oxygen, alkali metal or alkaline earth metal.

11. The liquid composition of matter of claim 1 wherein the primary lubricity component comprises from about 0.05 to about 5 percent by weight of the liquid composition of matter.

12. The liquid composition of matter of claim 1 wherein the carboxylic acids comprise from about 0.2 to about 12 percent by weight of the liquid composition of matter.

13. The liquid composition of matter of claim 1 comprising one or more at least partially dissolved salts of aliphatic acids and one or more at least partially dissolved salts of aromatic acids, wherein the molar ratio of aliphatic acids: aromatic acids is from about 0.2:1 to about 40:1.

14. The liquid composition of matter of claim 1 comprising one or more at least partially dissolved salts of monocarboxylic aliphatic acids and one or more at least partially dissolved salts of dicarboxylic aliphatic acids, wherein the molar ratio of monocarboxylic aliphatic acids: dicarboxylic aliphatic acids is from about 0.2:1 to about 20:1.

15. The liquid composition of matter of claim 1 comprising one or more at least partially dissolved salts of straight chain aliphatic monocarboxylic acids and one or more at least partially dissolved salts of branched aliphatic monocarboxylic acids, wherein the molar ratio of straight chain aliphatic monocarboxylic acids: branched aliphatic monocarboxylic acids is from about 0.1:1 to about 50:1.

16. The liquid composition of matter of claim 1 wherein for said one or more at least partially dissolved salts of carboxylic acids the ratio of carboxylate groups: carbon atoms is from about 0.02:1 to about 0.7:1.

17. A process for working a metal substrate comprising the steps of:
  (a) applying the liquid composition of matter of claim 1 to a surface of the metal substrate; and
  (b) working the metal substrate.

18. A process for lubricating a surface of a metal substrate comprising applying the liquid composition of matter of claim 1 to said surface.

19. A liquid composition of matter that is useful as a metal working lubricant, said composition having a pH value of from about 6.3 to about 11 and comprising:
  (A) at least one primary lubricity component selected from the group consisting of
    (a) polyoxyalkylene polyethers having a number average molecular weight of at least 200 Daltons; and
    (b) polyether esters;
  (B) at least partially dissolved salts of at least two different carboxylic acids selected from the group consisting of monocarboxylic aliphatic acids, dicarboxylic aliphatic acids, and aromatic carboxylic acids, wherein at least one carboxylic acid is selected from the group consisting of monocarboxylic aliphatic acids and dicarboxylic aliphatic acids;
  (C) water; and
  (D) not more than 0.2 weight percent of any element other than carbon, hydrogen, oxygen, alkali metal or alkaline earth metal.

20. The liquid composition of matter of claim 19 wherein at least one primary lubricity component is a polyoxyalkylene polyether made by addition polymerization of one or more alkylene oxides selected from the group consisting of ethylene oxide, propylene oxide and butene oxide.

21. The liquid composition of matter of claim 19 wherein at least one primary lubricity component is a polyoxyalkylene polyether made by reacting a polyalcohol having at least three hydroxyl moieties and at least three carbon atoms with one or more alkylene oxides selected from the group consisting of ethylene oxide and propylene oxide.

22. The liquid composition of matter of claim 21 wherein the polyalcohol is glycerin.

23. The liquid composition of matter of claim 21 wherein both ethylene oxide and propylene oxide are reacted with the polyalcohol, the molar ratio of propylene oxide; ethylene oxide being from about 1:1 to about 10:1.

24. The liquid composition of matter of claim 19 wherein at least one primary lubricity component has a number average molecular weight of from about 600 Daltons to about 6000 Daltons.

25. The liquid composition of matter of claim 19 wherein at least one primary lubricity component is a polyether ester made by condensing at least one alkylene oxide, glycol, or hydroxy-terminated polyoxyalkylene polyether with at least one carboxylic acid.

26. The liquid composition of matter of claim 19 wherein at least one primary lubricity component is a polyether ester containing at least two ester moieties per molecule.

27. The liquid composition of matter of claim 26 wherein said ester moieties are separated by 2 to 15 carbon atoms.

28. The liquid composition of matter of claim 19 wherein at least one primary lubricity component is a polyether ester containing at least one terminal esterifying moiety conforming to the general chemical formula —$(C_nH_{2n}O)_d$—H wherein each of n and d independently represents a positive integer, which may be the same or different, n is 2 to 4, and d is 1 to 30.

29. The liquid composition of matter of claim 19 comprising at least one salt of a carboxylic acid selected from the group consisting of benzoic acid, 7,7-dimethyl-1-octanoic acid, 1-heptanoic acid, salicylic acid, sebacic acid, 2,4-dihydroxy benzoic acid, dodecanedioic acid, undecanedioic acid, and mixtures thereof.

30. A process for working a metal substrate comprising the steps of:
  (a) applying the liquid composition of matter of claim 19 to a surface of the metal substrate; and
  (b) working the metal substrate.

31. A process for lubricating a surface of a metal substrate comprising applying the liquid composition of matter of claim 19 to said surface.

32. A liquid composition of matter that is useful as a metal working lubricant, said composition comprising:

(A) at least one primary lubricity component selected from the group consisting of:
(a) polyoxyalkylene polyethers; and
(b) polyether esters;

(B) one or more at least partially dissolved salts of aliphatic acids and one or more at least partially dissolved salts or aromatic acids, wherein the molar ratio of aliphatic acids: aromatic acids is from about 0:2:1 to about 40:1; and (C) not more than 0.2 weight percent of any element except carbon, hydrogen, oxygen, alkaline earth metals, alkali metals, inorganically bonded halogens, inorganically bonded nitrogen, inorganically bonded sulfur, and inorganically bonded phosphorus.

33. A liquid composition of matter that is useful as a metal working lubricant, said composition comprising:

(A) at least one primary lubricity component selected from the group consisting of:
(a) polyoxyalkylene polyethers; and
(b) polyether esters;

(B) one or more at least partially dissolved salts of straight chain aliphatic monocarboxylic acids and one or more at least partially dissolved salts of branched aliphatic monocarboxylic acids, wherein the molar ratio of straight chain aliphatic monocarboxylic acids: branched aliphatic monocarboxylic acids is from about 0:1:1 to about 50:1; and (C) not more than 0.2 weight percent of any element except carbon, hydrogen, oxygen, alkaline earth metals, alkali metals, inorganically bonded halogens, inorganically bonded nitrogen, inorganically bonded sulfur, and inorganically bonded phosphorus.

* * * * *